US008131982B2

(12) United States Patent
Emma et al.

(10) Patent No.: US 8,131,982 B2
(45) Date of Patent: Mar. 6, 2012

(54) BRANCH PREDICTION INSTRUCTIONS HAVING MASK VALUES INVOLVING UNLOADING AND LOADING BRANCH HISTORY DATA (75) Inventors: Philip G. Emma, Danbury, CT (US); Allan M. Hartstein, Chappaqua, NY (US); Keith N. Langston, Woodstock, NY (US); Brian R. Prasky, Wappingers Falls, NY (US); Thomas R. Puzak, Ridgefield, CT (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 12/138,789

(22) Filed: Jun. 13, 2008

(65) Prior Publication Data

US 2009/0313462 A1    Dec. 17, 2009

(51) Int. Cl.
*G06F 9/312* (2006.01)
(52) U.S. Cl. ........................ 712/225; 712/240
(58) Field of Classification Search .......... None
See application file for complete search history.

(56) References Cited

U.S. PATENT DOCUMENTS

| 4,370,711 | A | | 1/1983 | Smith |
| 4,679,141 | A | | 7/1987 | Pomerene et al. |
| 5,606,675 | A | | 2/1997 | Sakamura et al. |
| 5,642,493 | A | | 6/1997 | Burgess |
| 5,682,531 | A | * | 10/1997 | Nakamura ............ 718/108 |
| 5,742,804 | A | | 4/1998 | Yeh et al. |
| 5,774,685 | A | | 6/1998 | Dubey |
| 5,796,971 | A | | 8/1998 | Emberson |
| 5,859,999 | A | * | 1/1999 | Morris et al. ............ 712/224 |
| 5,987,495 | A | * | 11/1999 | Ault et al. ............ 718/108 |
| 6,029,228 | A | | 2/2000 | Cai et al. |
| 6,055,621 | A | | 4/2000 | Puzak |
| 6,092,188 | A | | 7/2000 | Corwin et al. |
| 6,108,775 | A | * | 8/2000 | Shiell et al. ............ 712/240 |
| 6,189,091 | B1 | | 2/2001 | Col et al. |
| 6,272,623 | B1 | | 8/2001 | Talcott |
| 6,308,322 | B1 | | 10/2001 | Serocki et al. |
| 6,324,643 | B1 | | 11/2001 | Krishnan et al. |
| 6,408,325 | B1 | * | 6/2002 | Shaylor ............ 718/108 |
| 6,427,192 | B1 | * | 7/2002 | Roberts ............ 711/133 |
| 6,560,693 | B1 | | 5/2003 | Puzak et al. |
| 6,611,910 | B2 | | 8/2003 | Sharangpani et al. |
| 6,671,762 | B1 | * | 12/2003 | Soni et al. ............ 710/267 |

(Continued)

OTHER PUBLICATIONS

Philip G. Emma et al., U.S. Appl. No. 12/721,933 entitled "Prefetching Branch Prediction Mechanisms," filed with the U.S. Patent and Trademark Office on May 11, 2010.

(Continued)

*Primary Examiner* — David Huisman
(74) *Attorney, Agent, or Firm* — Cantor Colburn LLP; William J. Stock (57) ABSTRACT A method for branch prediction, the method comprising, receiving a load instruction including a first data location in a first memory area, retrieving data including a branch address and a target address from the first data location, and saving the data in a branch prediction memory, or receiving an unload instruction including the first data location in the first memory area, retrieving data including a branch address and a target address from the branch prediction memory, and saving the data in the first data location.

9 Claims, 10 Drawing Sheets

U.S. PATENT DOCUMENTS

| | | | |
|---|---|---|---|
| 6,725,365 | B1 | 4/2004 | Cofler et al. |
| 6,760,835 | B1 | 7/2004 | Yu |
| 6,877,089 | B2 | 4/2005 | Sinharoy |
| 6,957,327 | B1 | 10/2005 | Gelman et al. |
| 7,197,630 | B1 | 3/2007 | Alsup et al. |
| 7,272,664 | B2 * | 9/2007 | Arimilli et al. ............... 709/250 |
| 7,441,110 | B1 | 10/2008 | Puzak et al. |
| 7,870,371 | B2 | 1/2011 | Mutlu et al. |
| 2002/0194462 | A1 | 12/2002 | Henry et al. |
| 2005/0278513 | A1 * | 12/2005 | Aristodemou et al. ....... 712/228 |
| 2006/0218385 | A1 | 9/2006 | Smith et al. |
| 2007/0083739 | A1 | 4/2007 | Glew |
| 2007/0088915 | A1 | 4/2007 | Archambault et al. |
| 2007/0250666 | A1 | 10/2007 | Sartorius et al. |
| 2008/0052499 | A1 | 2/2008 | Koc |
| 2009/0089564 | A1 | 4/2009 | Brickell et al. |
| 2010/0287358 | A1 | 11/2010 | Emma et al. |

OTHER PUBLICATIONS

Comp.arch (ARM V5: Preload with seperate I and D Cache); Newsgroup: comp.arch; thread spanning Sep. 11, 2003 to Sep. 20, 2003; 29 pages.

IBM TDB (Typing Data Prefetching to Branch Prediction); TBD-ACC-No. NN931069; IBM Technical Disclosure Bulletin, Oct. 1993, US; vol. 36, Issue 10, pp. 69-70, Oct. 1, 1993; 2 pages.

* cited by examiner

FIG. 1

Prior Art

Branch History Table 120

| Branch Address 202 | Target Address 204 | Tag Information 206 |
|---|---|---|
| | | |

Prior Art

Load BHT Formats

Unload BHT Formats

BRANCH PREDICTION INSTRUCTIONS HAVING MASK VALUES INVOLVING UNLOADING AND LOADING BRANCH HISTORY DATA

BACKGROUND OF THE INVENTION

1. Field of the Invention

This invention relates generally to computer processing techniques and, more particularly, to methods involving branch prediction in computer processing.

2. Description of Background

Branch prediction is used to improve the performance of processors. When a processor detects a conditional branch, an uncertainty is temporarily introduced into the processor pipeline. If the branch is taken, the next instruction is fetched from an address usually specified in the branch instruction. If the branch is not taken, execution proceeds to the instruction following the branch.

Large amounts of chip area are dedicated to the processor branch prediction mechanism. In practice, the branch address and target address of each branch encountered by the processor are saved in a table, called a Branch History Table (BHT). During the instruction fetch phase of a processor pipeline, the BHT is searched for a matching branch address, and if found, the target address is fetched, and the instruction located at the target address becomes the next instruction decoded. If no matching branch address is found in the instruction fetch segment, instruction fetching and decoding continue down the sequential path. Branch prediction errors occur when the table is incorrect. If the BHT predicted the branch to be taken and the predicted branch is not taken, the BHT entry is deleted or updated to record the correct branch action pattern. If a branch predicted not taken is taken, typically a new entry is made in the BHT, or the new branch pattern is updated. If the predicted target address is wrong, the correct address is saved in the BHT.

The prediction accuracy of the branch prediction mechanism (BHT) is proportional to the size of the BHT. Branch prediction accuracy may reach 80 to 90 percent, but there is a severe penalty when the BHT is incorrect. Prediction errors may cause the processor pipeline to be flushed, causing pipeline drain. A single prediction error may introduce a pipeline bubble (idle cycles) of 10 to 20 cycles or longer, depending on the pipeline length.

Increasing the size of the BHT reduces the penalty caused by prediction errors. The BHT may contain 4K to 16K entries, and with each entry approximately 8 bytes, (4 bytes for the branch address and 4 bytes for the target address) the overall size of the BHT may be 32K to 128K bytes. Although a larger BHT would reduce the percentage of wrong predictions and resultant penalties, the table hardware must be packaged in the speed critical instruction fetch and decode regions of the processor. The location of the table hardware limits the size of the BHT.

It is desirable to reduce the table hardware associated with the BHT without sacrificing prediction accuracy.

SUMMARY OF THE INVENTION

The shortcomings of the prior art are overcome and additional advantages are achieved through an exemplary method for branch prediction, the method comprising, receiving a load instruction including a first data location in a first memory area, retrieving data including a branch address and a target address from the first data location data location, and saving the data in a branch prediction memory.

An alternate exemplary method for branch prediction, the method comprising, receiving an unload instruction including a first data location in a first memory area, retrieving data including a branch address and a target address from the branch prediction memory, and saving the data in the first data location data location.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving prefetching into a branch prediction mechanism are provided.

In this regard, it is desirable to reduce the size of a branch history table (BHT) size while improving branch prediction accuracy and processor performance. To accomplish this, a mechanism is described that allows future branch information to be prefetched into the BHT.

Prefetching future branch information into a prefetched branch history table (PBHT) allows a designer to reduce the size of the BHT without sacrificing branch prediction accuracy or performance. The branch information used to process the upcoming (future) instructions and branches of a program is held in the speed critical area (PBHT), while the full program and branch information are maintained in program save areas or main memory. The full size of the branch prediction mechanism is no longer limited in size by the hardware or cycle time considerations. The size of the PBHT need only by limited to the amount of branch information needed to capture the imminent working set of a program and the ability of the processor to stage (prefetch) the upcoming information into the PBHT on a timely basis.

Prefetching will improve processor performance if the items prefetched are used during branch prediction, and are fetched far enough in advance of their use.

It is desirable to provide a mechanism to determine that the entries prefetched into the BHT are actually used by the processor. This further increases the prefetching accuracy for the items prefetched. This is achieved by providing each entry prefetched with a confirmation (used) bit as part of the BHT entry. The bit is initially unset (equals 0) when a prefetch occurs and reset (equals 1) if the prefetch is used during branch prediction. If the processor does not use the prefetched entry, the confirmation bit associated with that entry would prevent that entry from being prefetched in the future.

The above mechanisms are achieved by providing two new instructions: unload BHT (UBHT) and load BHT (LBHT). The unload BHT instruction takes the most recent (youngest) BHT entries and saves them (writes them) in a branch information save area, while the load BHT instruction reverses the direction that information is transferred. The load BHT instruction takes information from the branch information save area and writes it into the BHT. Since program execution patterns are repetitive, reloading the BHT with information collected during a previous execution phase of a program will produce a higher prefetch accuracy (prefetch to used ratio) than allowing the compiler to statically generate prefetches at compile time.

The contents of the PBHT are not based on the spatial and temporal referencing patterns, but on a relative certainty of future use as specified in the repetitive execution flow of a program. The PBHT control mechanism dynamically captures (saves) the branch information of a program and then prefetches (reloads) the relevant information back into the PBHT ahead of its use. Thus the processor requires fast access only to the branch information which is in close (logical) proximity to the current instructions being processed. This represents only a small subset of the information that would be contained in a full BHT. The information contained in a full BHT can be prefetched from main memory (collected in program save areas or compiler analysis) and prefetched into the PBHT, ahead of its use, to maintain a high prediction accuracy.

Figure 1:
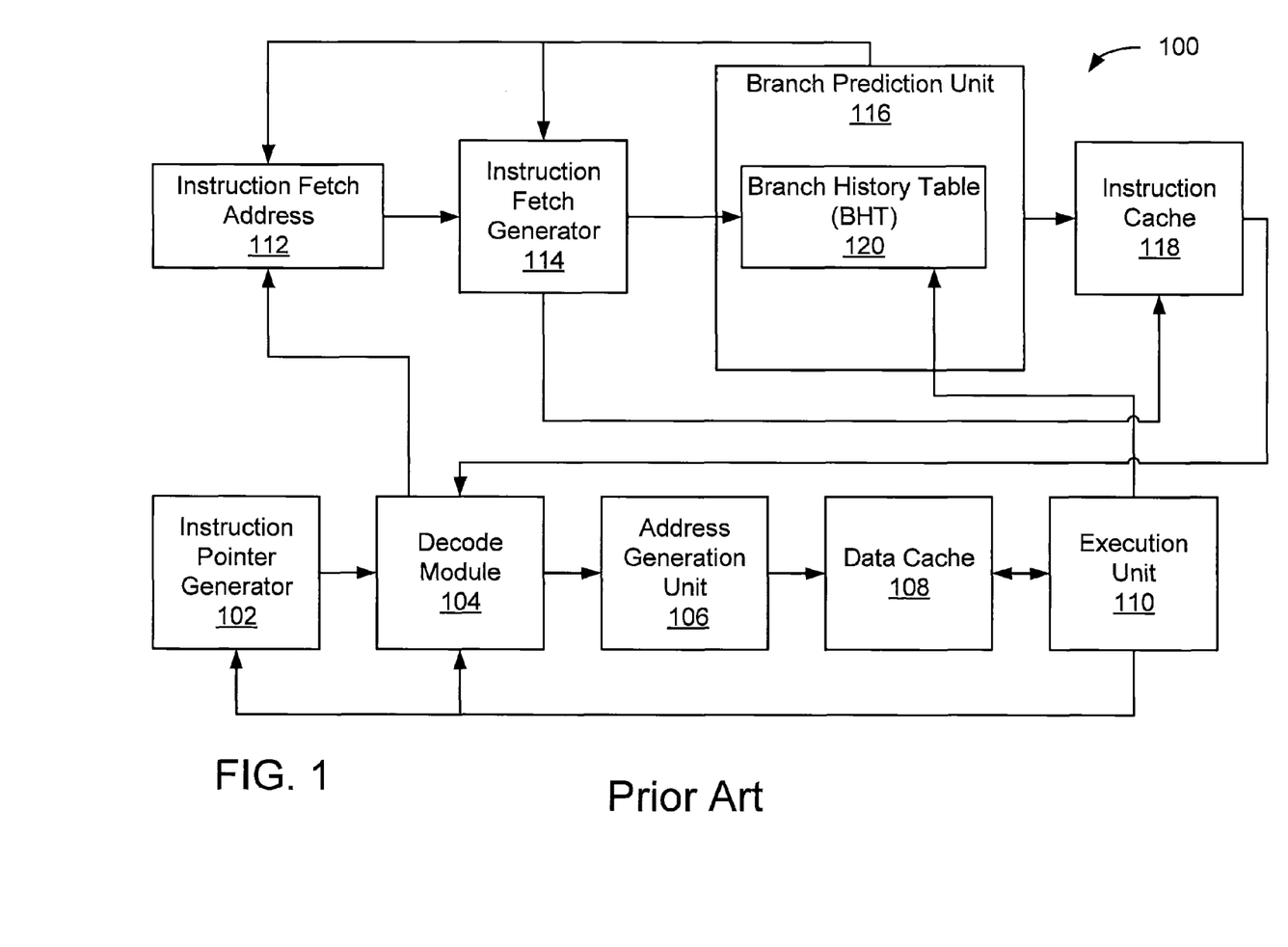
FIG. 1 illustrates a prior art example of a processor.

FIG. 1 illustrates a prior art example of a processor 100. The processor 100 includes an instruction pointer generator 102 communicatively connected to a decode module 104. The decode module 104 is communicatively connected to an address generation unit 106. A data cache 108 is communicatively connected to the address generation unit 106 and an execution unit 110. A branch prediction unit 116 including a branch history table (BHT) 120 is communicatively connected to an instruction cache 118. An instruction fetch address 112 is communicatively connected to an instruction fetch generator 114. The instruction fetch generator 114 is communicatively connected to the branch prediction unit 116 and the instruction cache 118.

In operation, instructions requiring operands are sent to the address generation unit 106 via the decode module 104. The operands are fetched from the data cache 108 and the instructions are processed in the execution unit 110. Stores are sent from the execution unit 110 to the data cache 108.

The instruction fetch, and branch prediction mechanism processes occur in parallel to the decode, cache access, and execution flow described above. An instruction fetch address 112 is sent to the instruction fetch generator 114. The instruction fetch generator 114 generates a next instruction fetch address and saves the next instruction fetch address in the instruction fetch address 112. The instruction fetch generator 114 also sends the instruction fetch address to the instruction cache 118. The instruction cache 118 sends the contents of the instruction fetch address the decode module 104. Branch prediction occurs in parallel. The address of the instruction fetch is sent to the branch predict unit 116.

The branch prediction unit 116 includes the BHT 120 that saves the branch address and target address of the most recently executed branches encountered by the processor 100. The address from the instruction fetch generator 114 is compared with each branch address saved in the BHT. If a match occurs (a branch is contained in the most recent instruction fetch) the next instruction fetch address will be the predicted target address of the matching branch. This address then becomes the next instruction fetch and is sent back to the instruction fetch address 112 and instruction fetch generator 114. If no match occurs, the next instruction fetch is the next-sequential address from the current instruction fetch address. Finally, BHT updates are sent from the execution unit 110 to the BHT 120.

Figure 2:
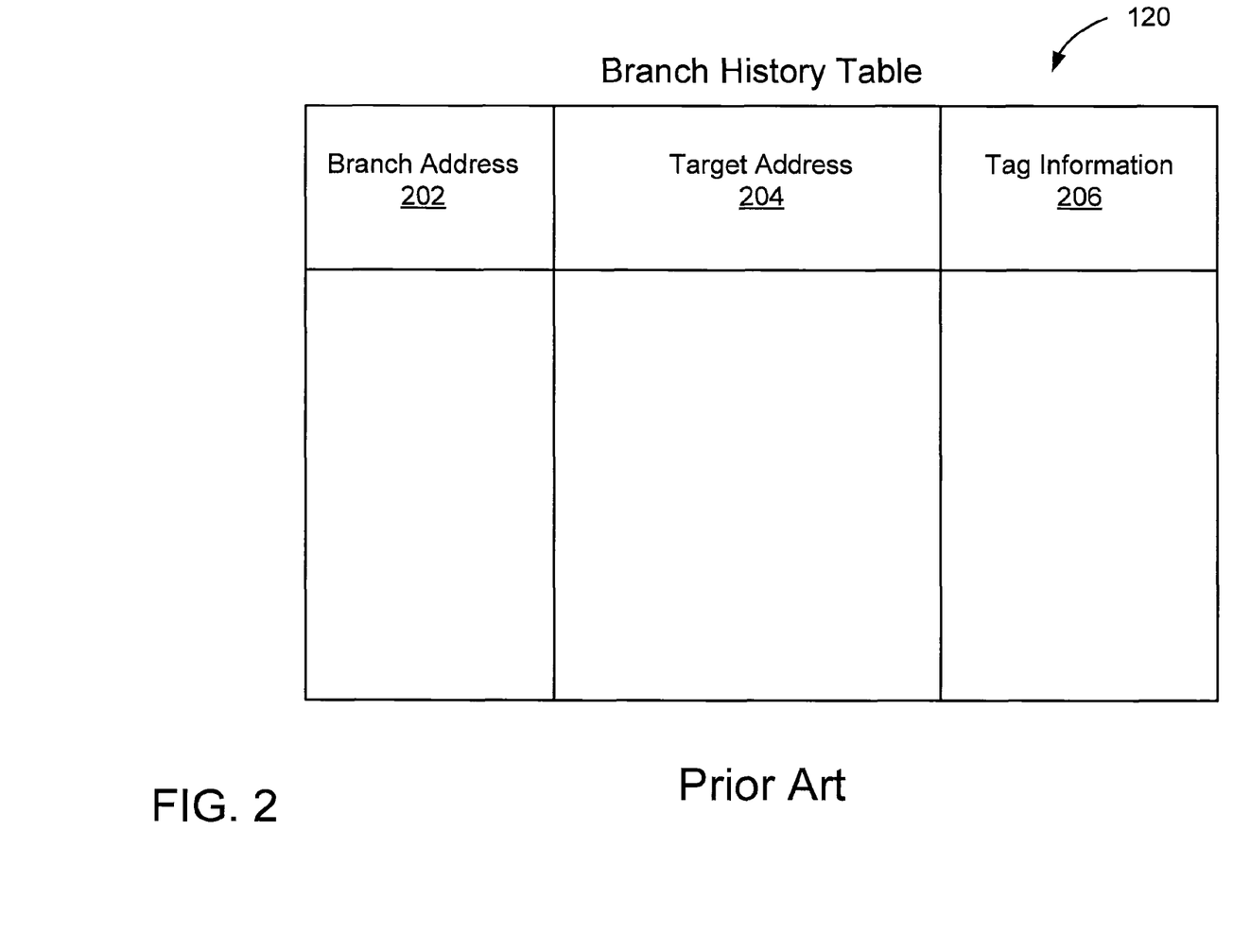
FIG. 2 illustrates a prior art example of a branch history table.

A prior art example of the BHT 120 format is illustrated in FIG. 2. The BHT 120 is represented as an array of entries where each entry contains a branch address 202 of a previously executed branch, a corresponding target address 204, and branch tag information 206. The branch tag information 206 contains information identifying the branch as conditional or unconditional, taken/not taken history patterns, changing target patterns, thread or process identifiers, and other prediction hints and instruction prefetch and execution information.

Figure 3A:
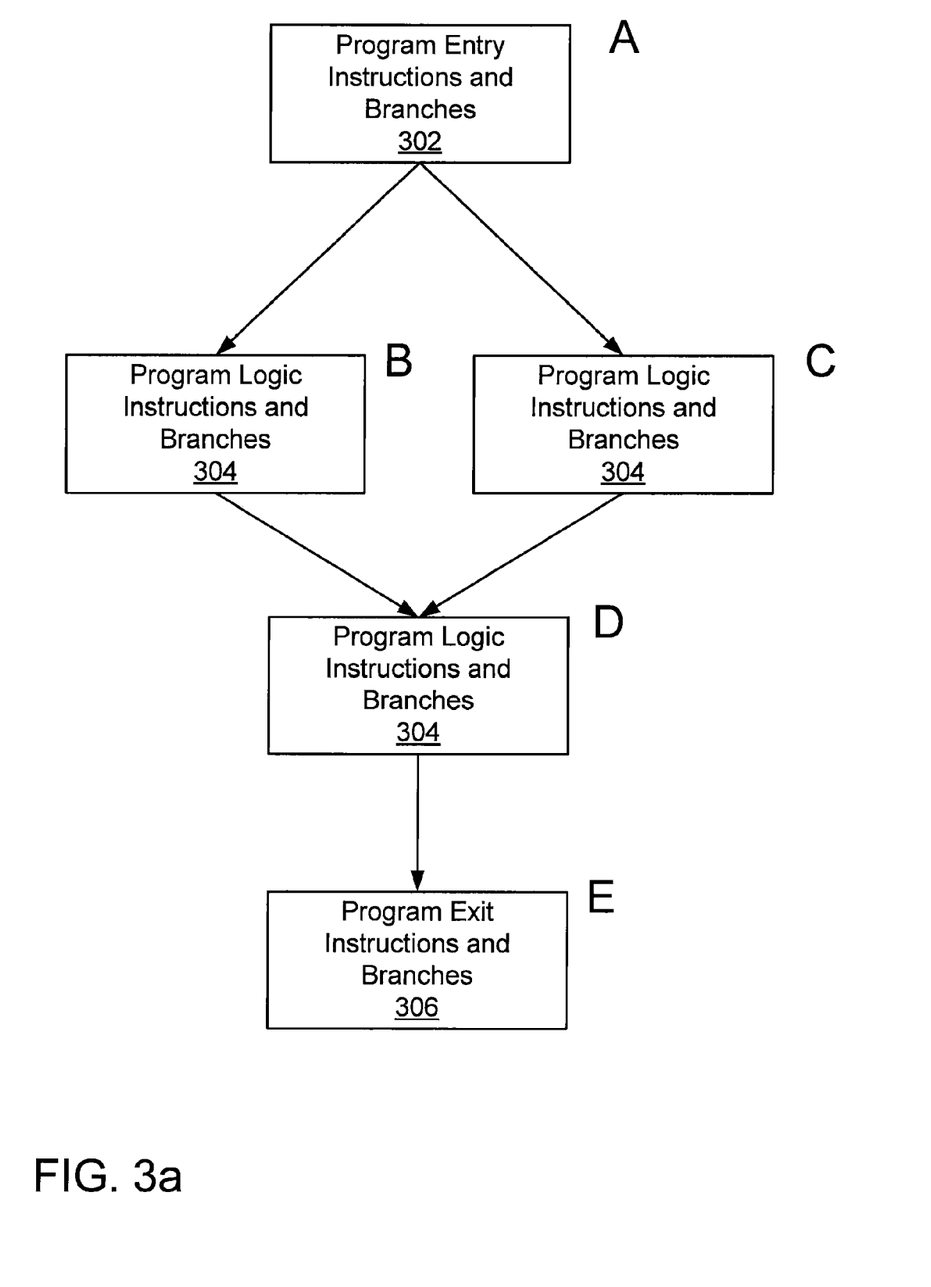
FIGS. 3a and 3b illustrate an exemplary embodiment of a high level block diagram of a program executed by a processor.

FIGS. 3a and 3b illustrate an exemplary embodiment of a high level block diagram of a program executed by a processor. FIG. 3a includes a program consisting of 5 blocks. The first block 302 (A) represents program entry. In block 302, the program begins execution and program linkage is established. Block 302 includes many instructions and branches, and branches to one of two subsections, blocks 304 B and C. Each block 304 may include many additional instructions and branches. These blocks 304 B and C merge into block 304 D. The program exit is shown in block 306 E.

Figure 3B:
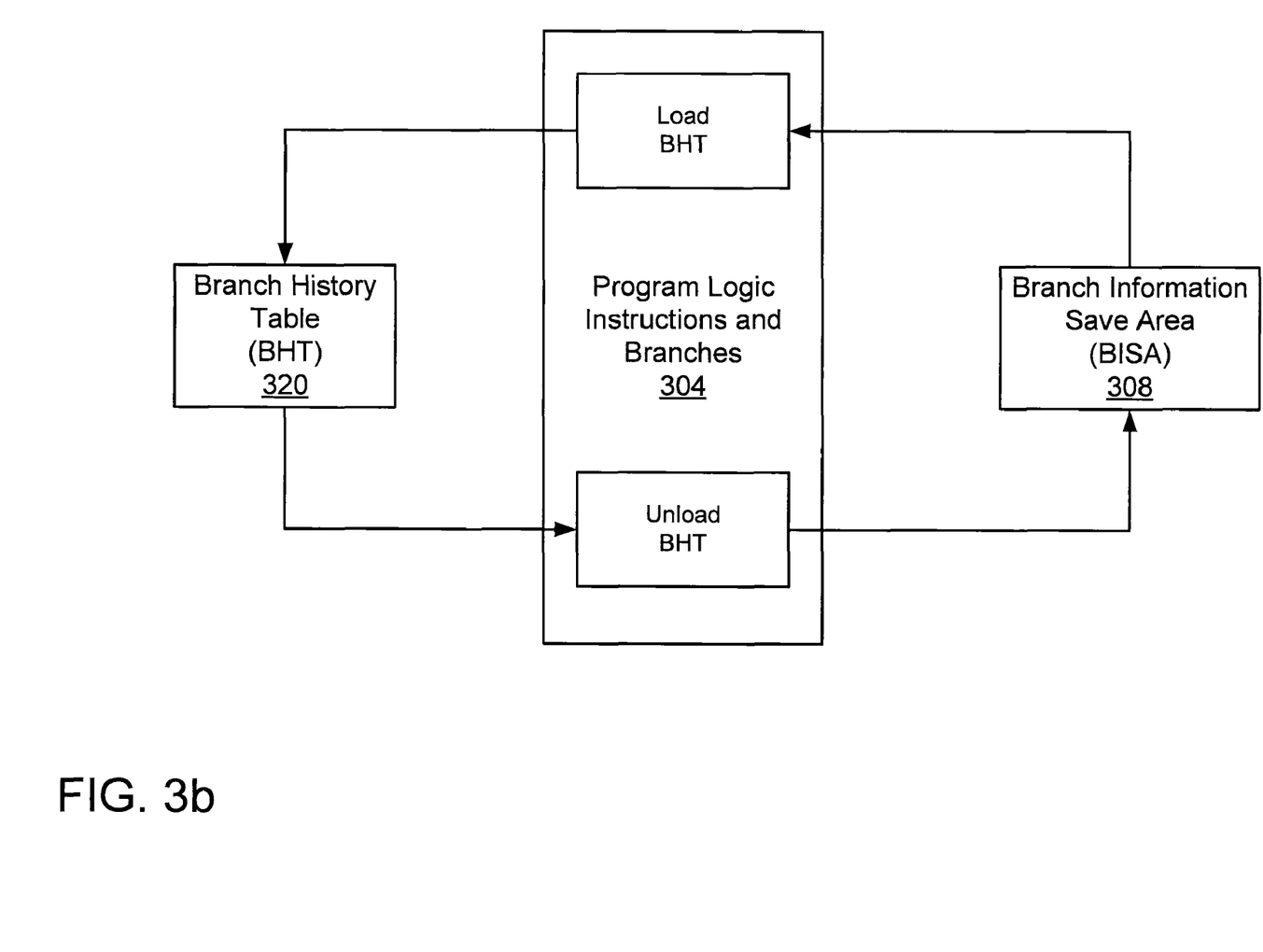

FIG. 3b further illustrates an exemplary embodiment of a block diagram showing the prefetching of information into the branch predictor (loading a BHT entry) and the saving of information that was recently in the branch predictor (unloading a BHT entry). The BHT entry loaded includes a branch address and a target address of an upcoming branch. FIG. 3b includes the program logic instructions and branches block 304 and a branch information save area (BISA) 308. The BISA 308 represents a section of memory where branch prediction information (BHT information) is written and read. Two instructions are employed in the program logic instructions to prefetch BHT entries and save BHT entries- Load BHT (LBHT) and Unload BHT (UBHT). During a load operation, BHT information is read from the BISA 308. During an unload operation, BHT information is written to the BISA 308. The Unload BHT instruction allows a programmer to identify BHT entries that have been previously used for branch prediction and develop a run-time prediction mechanism to prefetch these entries back into the BHT 120 for future use.

New BHT updates are staged (prefetched) into the BHT 320 when a BHT load operation is added to the entry to each program logic instruction 304. The BHT load operation avoids initial branch prediction errors caused by new (first time) taken branches. Initially the information contained in the BISA 308 is generated by a compiler, however future executions of the program will prefetch BHT entries that have been written to the BISA 308 by a previously executed unload BHT instruction. The prefetched BHT entries represent dynamically collected BHT entries that were saved the last time the program was executed. Dynamically collecting branch information and subsequent reloading of the branch information improves branch prediction accuracy while allowing the BHT 320 to be reduced in size.

Figure 4:
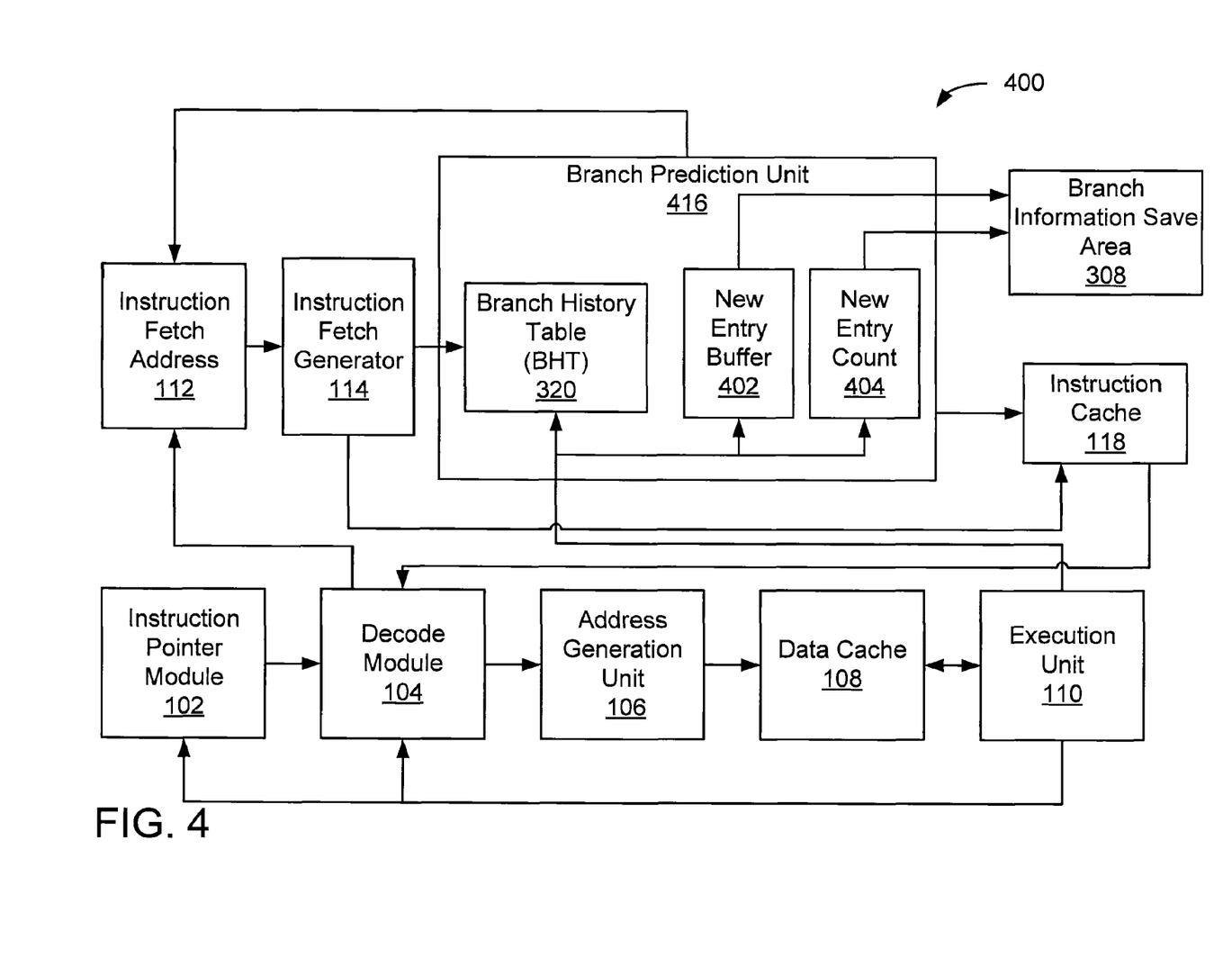
FIG. 4 illustrates an exemplary embodiment of a processor.

FIG. 4 illustrates an exemplary embodiment of a processor 400 including a branch prediction unit 416 having the BHT 320 memory, a new entry buffer 402 memory, and a new entry count 404 memory. The processor 400 includes a branch information save area 308 memory. The processor 400 also includes similar components that operate similarly to the processor 100 illustrated in FIG. 1.

Figure 5:
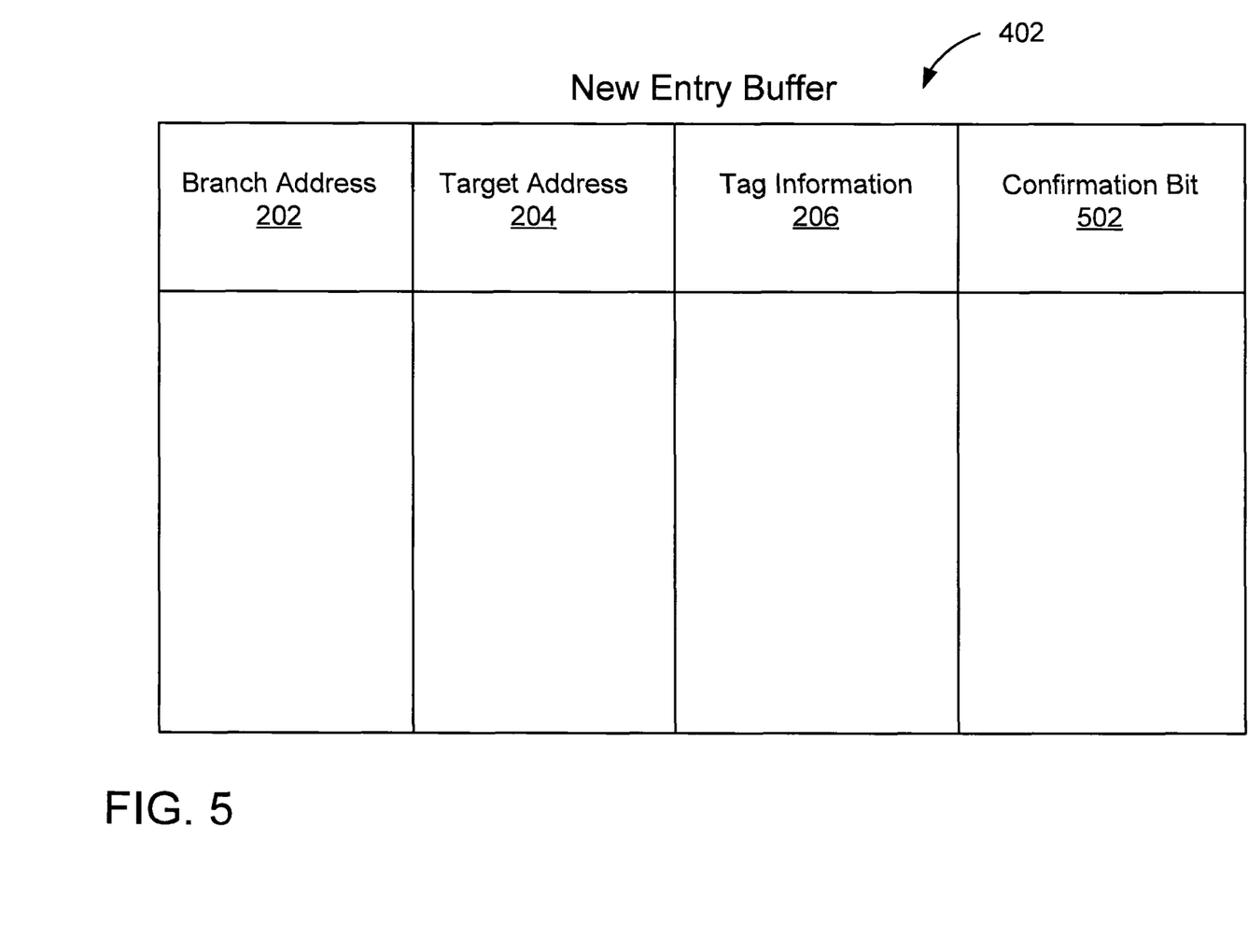
FIG. 5 illustrates an exemplary embodiment of the new entry buffer.

FIG. 5 illustrates an exemplary embodiment of the new entry buffer (NEB) 402. The NEB contains entries having a branch address 202, a target address 204, tag information 206, and a confirmation bit 502. In operation, BHT updates (entries) are sent simultaneously to the BHT 320 and the NEB 402. The tag information 206 corresponds to the BHT entry. The confirmation bit 502 may be, for example, a 1 or a 0. The confirmation bit 502 may be set to 0 when a BHT entry is prefetched into the BHT 320 and set to 1 if the BHT entry is used for branch prediction. An entry is used if it matches an instruction fetch address generated during instruction fetching. However, all BHT updates (sent from the execution unit 110) that are entered into the NEB 402 have the confirmation bit 502 set to 1, indicating they are used and should be prefetched. Whereas a BHT may contain branch information on 4K to 16K difference branches, the size of the new entry buffer may be relatively small, for example, 8 to 32 entries. Its function is to hold branch information of the most recently executed branches. There are many management schemes that may be used for the entries in the NEB 402, for example, first-in-first-out (FIFO) or least-recently-used (LRU).

The value in the new entry count (NEC) 404 register (of FIG. 4) equals the number of entries made to the BHT 320 since the last Unload BHT instruction was executed. The NEC 404 register is incremented by one each time a new entry is made to the BHT 320. Incrementing the NEC 404 stops when the value in the NEC 404 reaches the size of the NEB 402. The NEC 404 register is set to zero when a Unload BHT instruction is executed. (The Unload instruction empties (copies) the contents of the NEB 402 into the BISA 308.) The two paths link the branch prediction unit 416 to the BISA 308. The paths are used to write information to the BISA 308 when an Unload BHT instruction is encountered.

Figure 6:
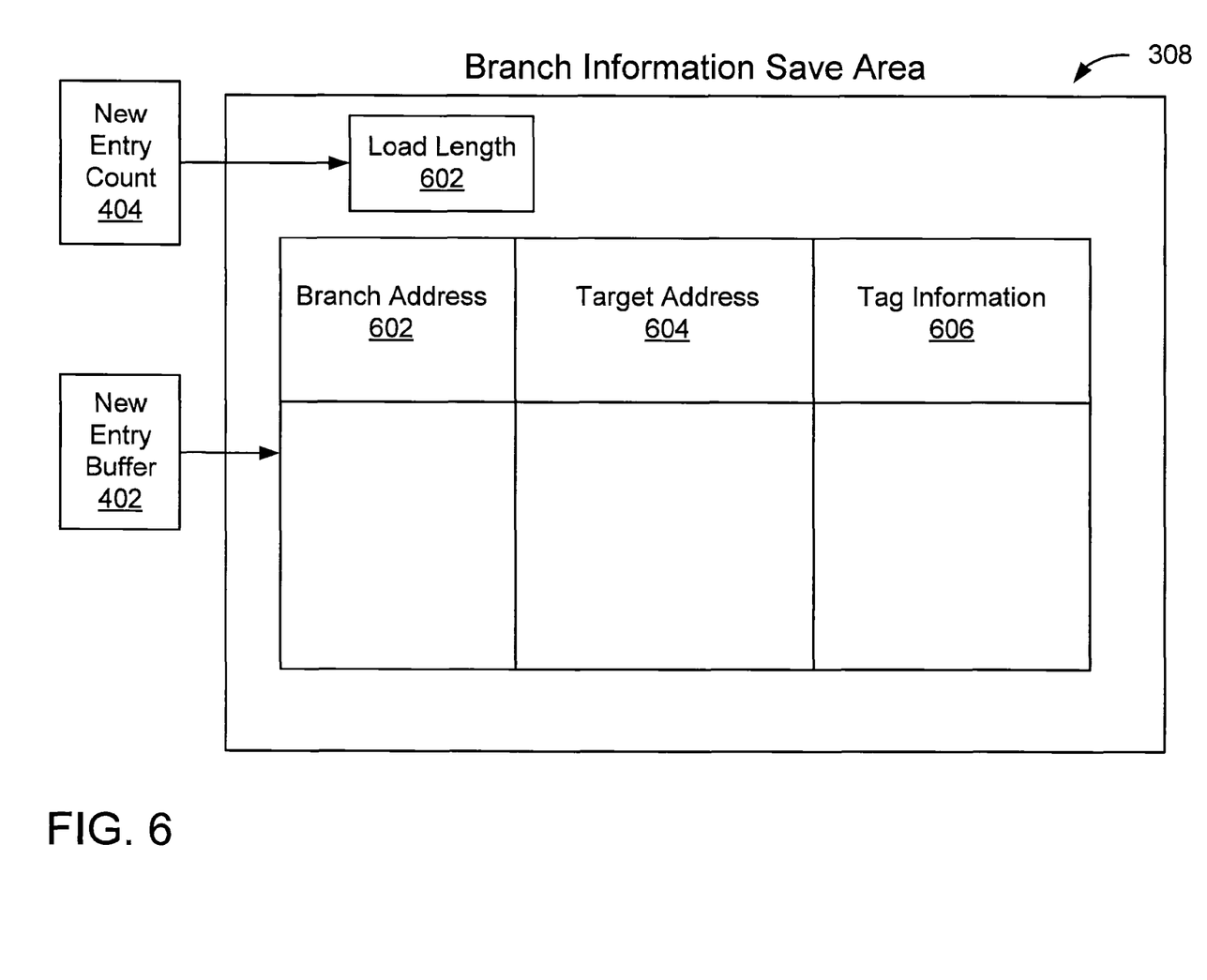
FIG. 6 illustrates an exemplary embodiment of a branch information save area.

FIG. 6 illustrates an exemplary embodiment of the BISA 308. The BISA 308 represents a section of memory that contains branch prediction information that is written to and read from the branch predictor. BISA 308 memory can be part of system or program save areas or part of the memory used to specify a Load or Unload BHT instruction. The BISA 308 includes a load length 602 equal to the number of entries written into the BISA 308. Tag information 606 identifies information such as, for example, branch type (conditional, unconditional), program or thread ID, past taken/not-taken branch patterns, opcode information, or branch guess information. A target address 604 is also included in the BISA 308.

The simplest form of a LBHT instruction prefetches a single BHT entry. The instruction consists of an opcode and branch/target address pair, where the branch/target address pair specifies the branch and target address for the upcoming branch. These addresses may be expressed as a relative distance from the LBHT instruction, base/displacement encoding of each address, register value plus offset, or represent the actual BHT entry settings (branch and target address values).

Figure 7A:
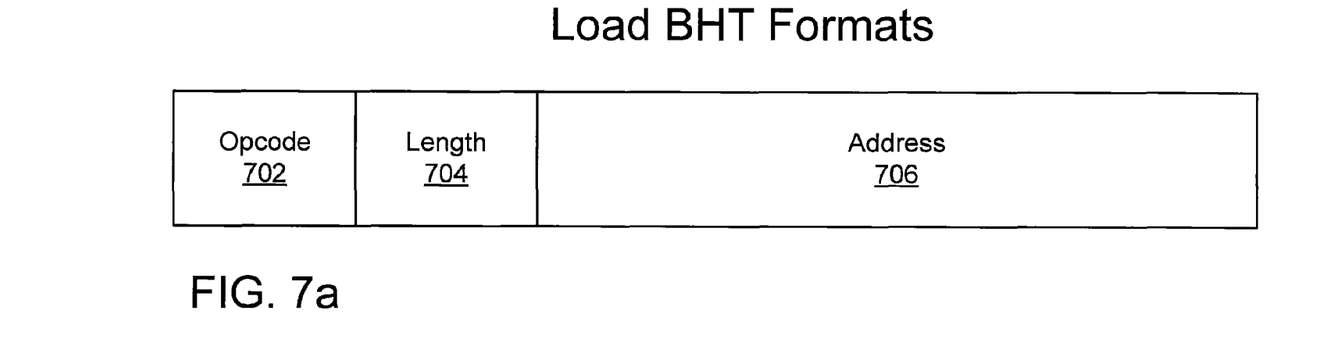
FIGS. 7a-c illustrate exemplary embodiments of Load BHT instructions.
Figure 7B:
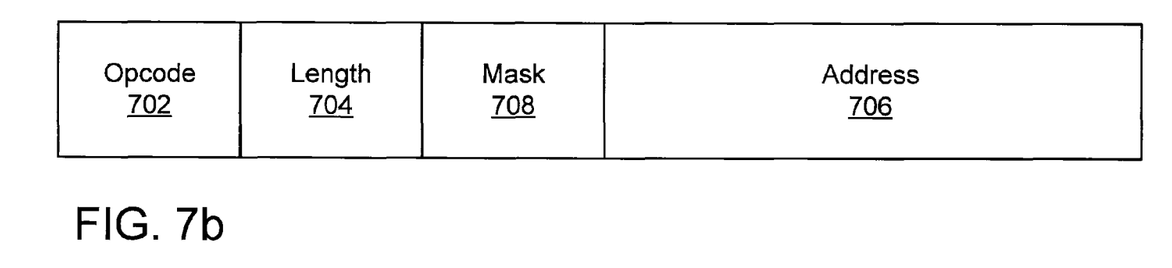
Figure 7C:
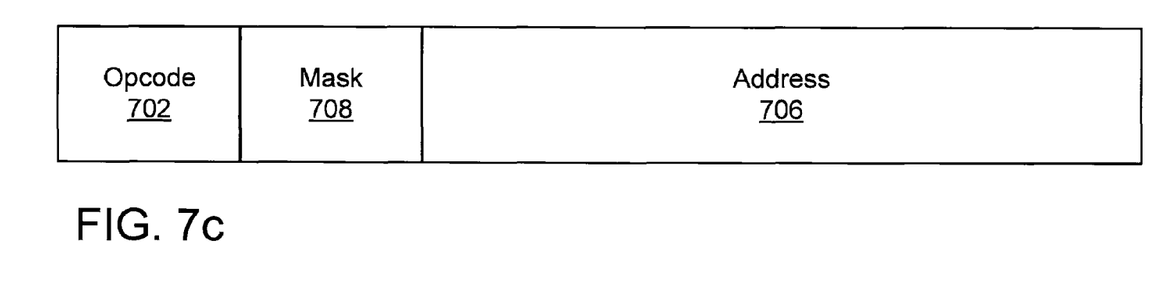

FIGS. 7a-c illustrate exemplary embodiments of Load BHT instructions. FIG. 7a, includes an opcode field 702, a length field 704, and an address identifier 706. The length field 704 specifies the numbers of entries to load from the BISA 308 to the BHT 320. The length field 704 may be expressed as a binary encoding in the instruction, or a register, where the value in the register indicates the number of entries to load. The address identifier 706 identifies the BISA 308 address that contains the branch prediction information (BHT 320 entries) to load. Opcode 702 allows simultaneous loading of the BHT 320 and NEB 402, or independent loading of the BHT 320. All entries loaded into the NEB 402 have a confirmation bit set to zero. The confirmation bit will determine if the entry is written into the BISA 308 when an unload BHT instruction is encountered.

FIG. 7b illustrates an alternative exemplary embodiment of an encoding for the Load BHT instruction. The opcode field 702, the length field 704, and the address identifier 706 are similar to the fields described above regarding FIG. 7a. The load BHT instruction includes a mask value 708 that allows the load instruction to selectively load branch information according to, for example, address range, thread or program IDs, and branch types. For example, one mask value 708 may specify that only branch information (branch address 602 values found in the BISA) within n bytes of the Load BHT are to be loaded from the BISA 308 into the BHT 320. In this example, the distance between the Load BHT instruction and the branch address 602 is determined by calculating the difference (in absolute value) between the address of the Load BHT instruction and each branch address 602 found in the BISA. The branch prediction information with branch addresses less than n bytes from the Load BHT instruction are then loaded to the branch prediction memory. The value of n may be, for example, from 16 to 4K.

Other examples of mask values 708 may specify a thread or program space identifier where only entries with matching tag information 606 (from the BISA 308) will be loaded into the BHT 320. Finally, other mask values 708 may select BHT entries according to an opcode type, or branch type (conditional, unconditional). All entries loaded into the NEB 402 have the confirmation bit set to zero. The confirmation bit will determine if the entry is unloaded into the BISA 308 when an unload BHT instruction is encountered.

FIG. 7c illustrates another alternative exemplary embodiment of an encoding for the Load BHT instruction. The opcode field 702 and the address identifier 706 are similar to the fields described above regarding FIG. 7a. The length field 704 is not included, however the length field 704 is specified as a value in the BISA 308.

The formats for the Unload BHT instructions are illustrated in FIGS. 8a-c and 9a-b. There are two types of unload instructions: an unload BHT instruction (UBHT) shown in FIGS. 8a-c, and an unload-with-confirmation BHT (UCBHT) shown in FIGS. 9a-b. The unload BHT instruction unloads all entries in the NEB 402 and writes the entries into the BISA 308, while the unload-with-confirmation instruction only unloads entries in the NEB that have a confirmation bit set to 1, indicating that the entries are recently used. With UCBHT a programmer has a certain degree of confidence that prefetching the entries back into the BHT 320 will be beneficial since the entries were used the last time the entries were in the BHT 320.

Figure 8A:
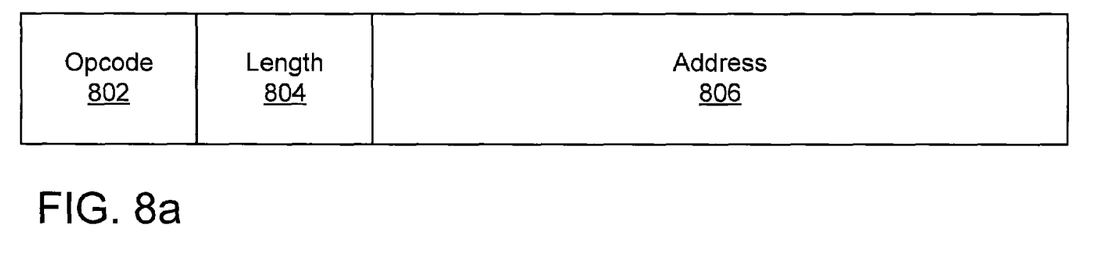
FIGS. 8a-c illustrate exemplary embodiments of Unload BHT instructions.

Referring to FIG. 8a, an exemplary embodiment of an unload BHT instruction is shown. Though the format of the unload BHT instruction is similar to the Load BHT instructions described above, the instructions operate differently. FIG. 8a includes an opcode field 802, a length filed 804, and a BISA address 806. The length field 804 may be used for two types of data. First, the length field 804 may specify the number of BHT entries to unload, and is specified as a part of the instruction. Second, the length field 804 may identify a register, where a value in the register denotes the number of BHT entries unloaded into the BISA 308. (The unload instruction copies BHT entries contained in the new-entry-buffer NEB 402 and writes them into the BISA 308.)

Figure 8B:
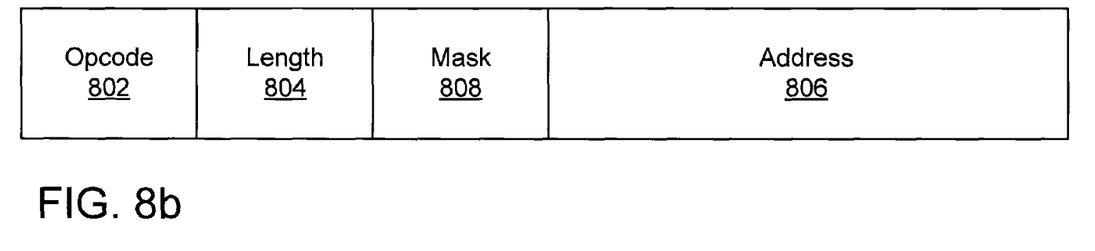

FIG. 8b illustrates an alternate exemplary embodiment of an unload BHT instruction similar to the instruction of FIG. 8a, further including a mask value 808. The mask field 808 is similar to the mask value 708 illustrated in FIG. 7b, and identifies the information to unload. The mask value 808 may specify an address range, thread or program ID, or branch type. For example, one example of a mask value 808 specifies that only NEB entries with branch address values within n bytes of the unload instruction will be unloaded into the BISA 308. The range of n may be, for example, from 16 to 4K. Other mask value 808 settings may specify a thread or program space identifier. Only entries with matching tag information (in the NEB 402) are unloaded into the BISA 308. Other mask value 808 may select NEB entries according to the opcode 802, or branch type (conditional, unconditional). Since the number of entries unloaded into the BISA 302 may vary and depends on the actual contents of the NEB 402 at the time of the instruction execution, the length field 804 identifies a register, and the value in the register at the end of execution identifies the number of entries unloaded (written).

Figure 8C:
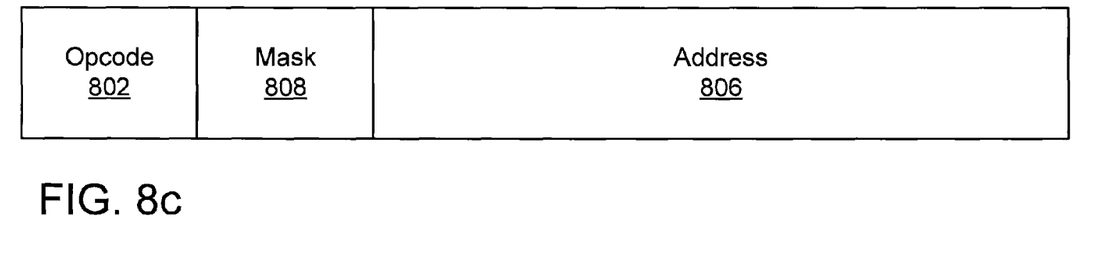

FIG. 8c illustrates another exemplary embodiment of an encoding of the unload BHT instruction. The mask 808, and BISA address 806 are similar to the fields described above regarding FIG. 8b. The length field 804 is omitted but is specified as a value in the BISA 308. The number of entries unloaded into the BISA 308 is written into a header portion of the BISA 308.

Figure 9A:
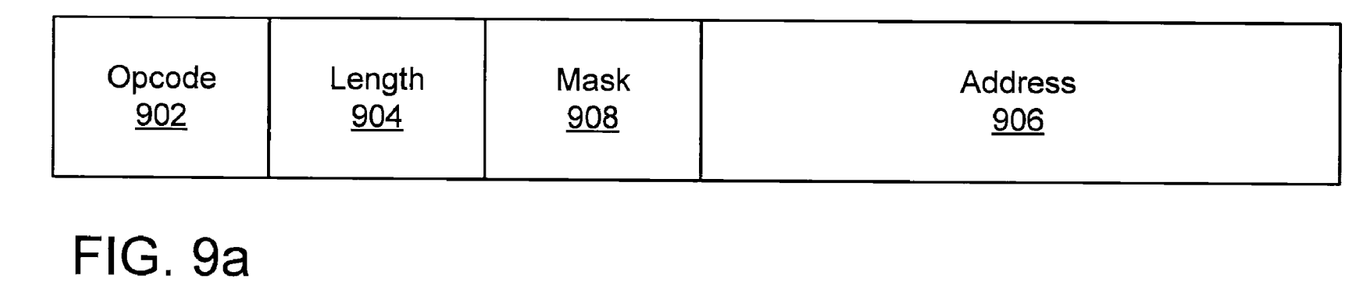
FIGS. 9a-b illustrate alternate exemplary embodiments of Unload BHT instructions.
Figure 9B:
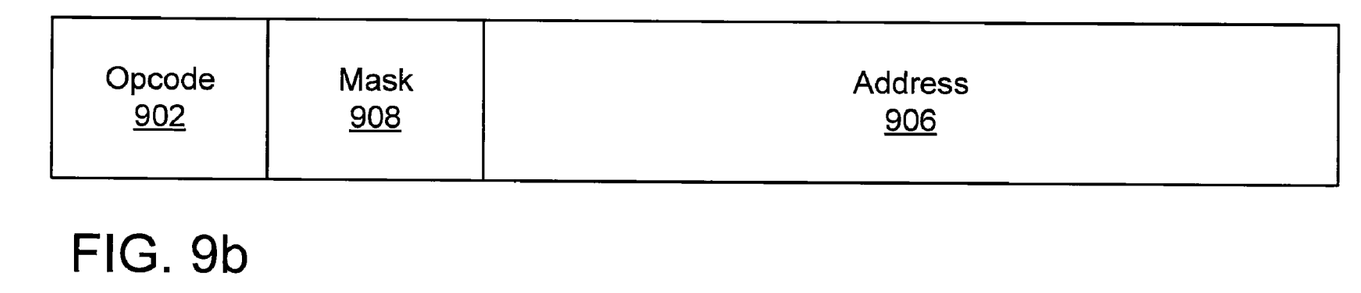

FIGS. 9a and 9b illustrate exemplary embodiments of the Unload-with-Confirmation BHT (UCBHT) instruction. In operation, only NEB 402 entries that have a confirmation bit set to 1 will be unloaded into the BISA 308. FIG. 9a includes an opcode field 902, a length field 904, a BISA address 906, and a mask value 908. The length field 904 identifies a register, and the value in the register denotes the number of BHT entries unloaded into the BISA 308 at the end of execution.

The mask field 908 is similar to the mask value 908 illustrated in FIG. 8b and identifies the information to unload. The mask value 908 may specify all entries, an address range, thread or program ID, or branch type. For example, if the mask value 908 is 'all', then all entries in the NEB 402 with a confirmation bit set to 1 are unloaded into the BISA 308. If the mask value 908 denotes an address range, then only NEB 402 entries with branch address values within n bytes of the unload instruction, and their confirmation bit on, will be unloaded into the BISA 308. Other mask value 908 may specify a thread or program space identifier. Entries with matching tag information (in the NEB 402) will be unloaded into the BISA 308. Other mask values 908 may select NEB entries according to the opcode, or branch type (conditional, unconditional). Since the number of entries unloaded into the BISA 308 can vary and depends on the actual contents of the NEB at the time of the instruction execution, the length field 904 identifies a register, and the value in the register at the end of execution identifies the number of entries unloaded (written).

FIG. 9b illustrates an alternate exemplary embodiment of the Unload BHT instruction. The mask value 908, and BISA address 906 shown are similar to the fields described in FIG. 9a. The length field 904 is omitted but is specified as a value in the BISA 308. The number of entries unloaded into the BISA 308 is written into a header portion of the BISA 308.

The technical effects and benefits of the above described embodiments provide a method and system for accurate branch prediction with a reduced amount of hardware.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for branch prediction, the method comprising:
receiving a load instruction including a first data location in a first memory area wherein the load instruction includes a mask value including at least one of:
an indication to load branch prediction information if a branch instruction associated with a branch address from the first data location is a conditional branch instruction;
a branch taken and branch not taken history pattern associated with a target address from the first data location;
a range of data locations defined by a distance from a location of the load instruction;
a thread identifier associated with the target address from the first data location;
a program identifier associated with the target address from the first data location; and
an opcode associated with the target address from the first data location;
retrieving the branch prediction information including the branch address and the target address from the first data location;
determining whether a tag value associated with the branch address received from the first data location matches the mask value; and
selectively transferring the branch prediction information to a branch prediction memory according to matching mask and tag values, wherein the branch prediction memory includes a branch history table including a branch address and a target address of a branch most recently executed by a processor.

2. The method of claim 1, wherein the method further comprises:
saving second branch prediction information including branch addresses and target addresses of recently executed branches in a new entry buffer; and
incrementing a new entry count register responsive to receiving the load instruction and the second branch prediction information.

3. The method of claim 2, wherein the method further comprises:
determining if the branch addresses and the target addresses of the recently executed branches have been used for branch prediction by the processor; and
saving an indicator that the branch addresses and the target addresses of the recently executed branches have been used for branch prediction by the processor in the new entry buffer responsive to determining that the branch addresses and the target addresses of the recently executed branches have been used for branch prediction by the processor.

4. The method of claim 1, wherein the method further comprises:
receiving a length field in the load instruction defining a range of data locations that include branch prediction information in the first memory area; and saving the branch prediction information included in the defined range of data locations in the branch prediction memory.

5. A method for branch prediction, the method comprising:
receiving an unload instruction including a first data location in a first memory area wherein the unload instruction includes a mask value including at least one of:
an indication to unload branch prediction information if a branch instruction associated with a branch address from a branch prediction memory is a conditional branch instruction;
a branch taken and branch not taken history pattern associated with a target address received from the branch prediction memory;
a range of data locations defined by a distance from a location of the unload instruction;
a thread identifier associated with the target address received from the branch prediction memory;
a program identifier associated with the target address received from the branch prediction memory; and
an opcode associated with the target address received from the branch prediction memory;
retrieving the branch prediction information including the branch address and the target address from the branch prediction memory;
determining whether a tag value associated with the branch address received from the branch prediction memory or a new entry buffer matches the mask value; and
selectively transferring the branch prediction information to the first data location according to matching mask and tag values, wherein the branch prediction memory includes a branch history table including a branch address and a target address of a branch most recently executed by a processor.

6. The method of claim 5, wherein the method further comprises:
retrieving second branch prediction information including the branch addresses and the target addresses of recently executed branches in a new entry buffer; and
decrementing a new entry count register responsive to receiving the unload instruction and the second branch prediction information.

7. The method of claim 6, wherein the method further comprises:
determining if the branch addresses and the target addresses of the recently executed branches have been used for branch prediction by the processor;
saving an indicator responsive to determining that the branch addresses and the target addresses of the recently executed branches have been used for branch prediction by the processor;
processing the indicator; and
saving branch prediction information from the branch prediction memory and the new entry buffer to the first memory area responsive to processing the indicator.

8. A method for branch prediction, the method comprising:
receiving a load instruction including a first data location in a first memory area, wherein the load instruction includes a mask value;
retrieving branch prediction information including a branch address and a target address from the first data location;
determining whether a tag value associated with the branch address received from the first data location matches the mask value; and
selectively transferring the branch prediction information to a branch prediction memory according to matching mask and tag values.

9. The method of claim 8, wherein the mask value includes at least one of:
an indication to load the branch prediction information if a branch instruction associated with the branch address is a conditional branch instruction;
a branch taken and branch not taken history pattern associated with the target address;
a range of data locations defined by a distance from a location of the load instruction;
a thread identifier associated with the target address;
a program identifier associated with the target address; and
an opcode associated with the target address.

* * * * *